(12) United States Patent
Gorla et al.

(10) Patent No.: US 9,570,907 B2
(45) Date of Patent: Feb. 14, 2017

(54) INPUT RAIL DYNAMIC POWER BALANCING AND MERGING

(71) Applicant: Nvidia Corporation, Santa Clara, CA (US)

(72) Inventors: Gabriele Gorla, Santa Clara, CA (US); Yaoshun Jia, Santa Clara, CA (US); Samuel Duell, Santa Clara, CA (US); Andrew Bell, Santa Clara, CA (US); Qi Lin, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 516 days.

(21) Appl. No.: 14/156,669

(22) Filed: Jan. 16, 2014

(65) Prior Publication Data
US 2015/0200541 A1 Jul. 16, 2015

(51) Int. Cl.
*H02J 1/10* (2006.01)
(52) U.S. Cl.
CPC .......... *H02J 1/102* (2013.01); *H02J 2001/106* (2013.01); *Y10T 307/696* (2015.04)
(58) Field of Classification Search
CPC .. H02J 1/102; H02J 2001/106; Y10T 307/696

USPC ........................................................... 307/80
See application file for complete search history.

(56) References Cited

U.S. PATENT DOCUMENTS

2013/0272547 A1* 10/2013 Waller, Jr. ............. H03F 1/0233
381/120
2013/0320769 A1* 12/2013 Sawyers ................. G06F 1/263
307/80

* cited by examiner

*Primary Examiner* — Jared Fureman
*Assistant Examiner* — Duc M Pham
(74) *Attorney, Agent, or Firm* — Richard Calderwood; Parker Justiss, P.C.

(57) ABSTRACT

A dynamic multiple input rail switching unit includes a plurality of DC input voltage rails and a rail switching section coupled to the plurality of DC input voltage rails that is configured to individually connect selected ones of the plurality of DC input voltage rails to a switched rail output. The dynamic multiple input rail switching unit also includes a rail selection section that is coupled to the rail switching section and configured to dynamically choose the selected ones by balancing rail supply currents from the plurality of DC input voltage rails based on rail supply current capacity margins and a switched rail output current. A dynamic multiple input rail switching unit operating method, and a dynamic multiple input rail power converter are also provided.

20 Claims, 5 Drawing Sheets

INPUT RAIL DYNAMIC POWER BALANCING AND MERGING

TECHNICAL FIELD

This application is directed, in general, to power conversion and, more specifically, to a dynamic multiple input rail switching unit, a dynamic multiple input rail switching unit operating method and a dynamic multiple input rail power converter.

BACKGROUND

Input power balancing of applications employing multiple input rails is typically very challenging. This situation is very common in PCIe boards that provide more that 75 watts of power and devices with redundant power supplies, such as servers. Currently, common approaches for load balancing are typically based on linear solutions, intermediate switched mode power supply (SMPS) converters or statically assigned current or power sharing. These solutions either incur power loss or do not allow the load sharing to be changed at run time. Improvements in this area would prove beneficial to the art.

SUMMARY

Embodiments of the present disclosure provide a dynamic multiple input rail switching unit, a dynamic multiple input rail switching unit operating method and a dynamic multiple input rail power converter.

In one embodiment, the dynamic multiple input rail switching unit includes a plurality of DC input voltage rails and a rail switching section coupled to the plurality of DC input voltage rails that is configured to individually connect selected ones of the plurality of DC input voltage rails to a switched rail output. The dynamic multiple input rail switching unit also includes a rail selection section that is coupled to the rail switching section and configured to dynamically choose the selected ones by balancing rail supply currents from the plurality of DC input voltage rails based on rail supply current capacity margins and a switched rail output current.

In another aspect, the dynamic multiple input rail switching unit operating method includes providing a plurality of DC input voltage rails and connecting individually selected ones of the plurality of DC input voltage rails to a switched rail output. The dynamic multiple input rail switching unit operating method also includes dynamically choosing the selected ones by balancing rail supply currents from the plurality of DC input voltage rails based on rail supply current capacity margins and a switched rail output current.

In yet another aspect, the dynamic multiple input rail power converter includes a plurality of DC input voltage rails and a rail switching section coupled to the plurality of DC input voltage rails that individually connects selected ones of the plurality of DC input voltage rails to a switched rail output, which is further connected to power conversion elements to provide a DC output voltage. The dynamic multiple input rail power converter also includes a rail selection section coupled to the rail switching section that dynamically chooses the selected ones by balancing rail supply currents from the plurality of DC input voltage rails based on rail supply current capacity margins and an input current of the power conversion elements and also includes an output voltage control section coupled to the rail selection section that provides regulation of the DC output voltage.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Embodiments of the present disclosure allow a single output power rail to be connected to multiple input power rails and dynamically change the percentage of power drawn from each of the input rails. A general approach employs having multiple switching devices connected to the different input power rails such that input power sharing is achieved by varying an activation timing ratio among the different switching devices. Additionally, the approach allows added power conversion losses to be avoided when employed as a SMPS.

Figure 1:
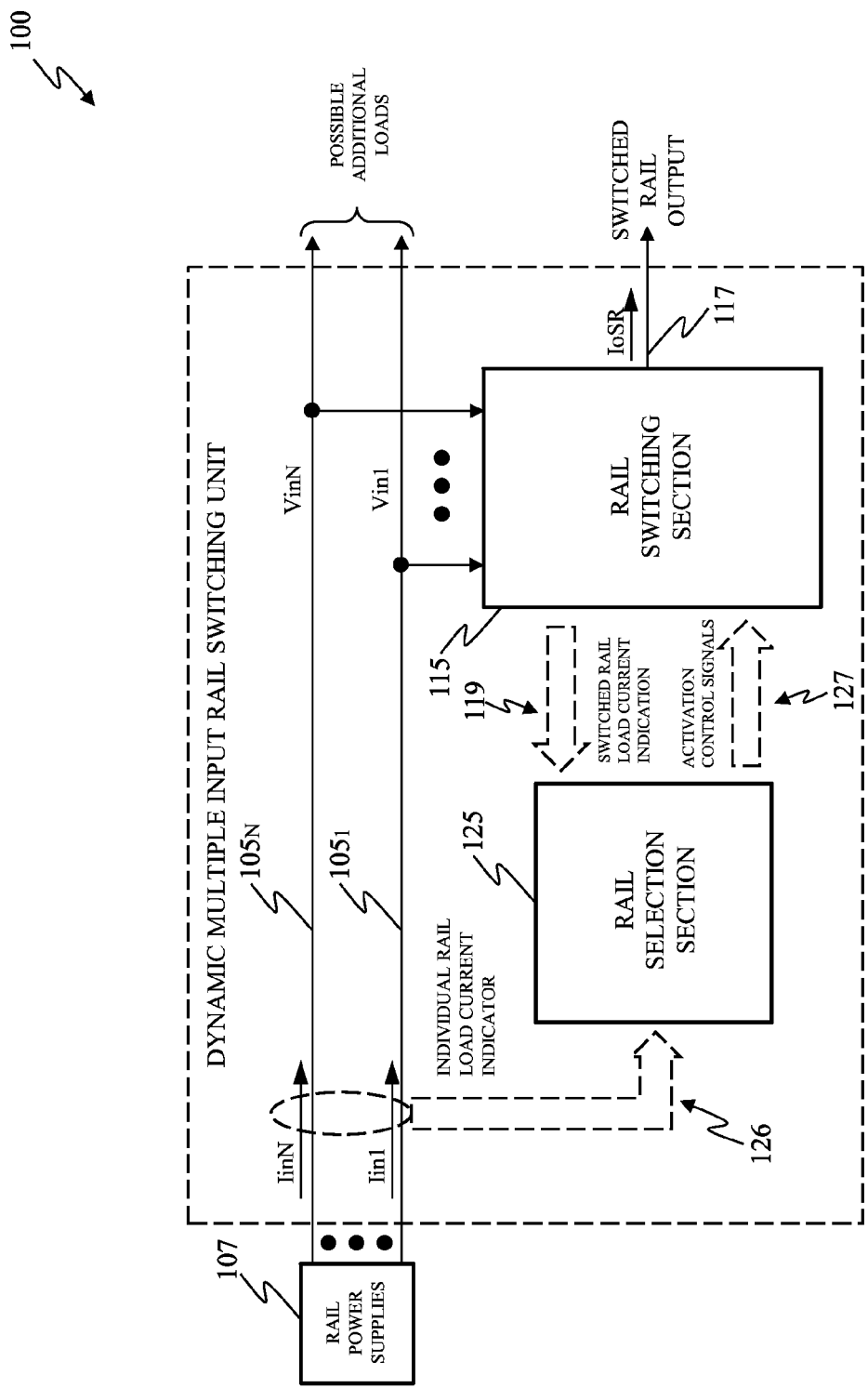
FIG. 1 illustrates a diagram of an embodiment of a dynamic multiple input rail switching unit constructed according to principles of the present disclosure.

FIG. 1 illustrates a diagram of an embodiment of a dynamic multiple input rail switching unit, generally designated 100, constructed according to principles of the present disclosure. The multiple input rail switching unit 100 includes a plurality of DC input voltage rails $105_1$-$105_N$, a rail switching section 115 and a rail selection section 125. The DC input voltage rails $105_1$-$105_N$ are connected to rail power supplies 107 to provide corresponding rail input voltages Vin1-VinN. As indicated, the DC input voltage rails $105_1$-$105_N$ may typically supply additional loads requiring current not employed by the rail switching section 115. Additionally, at least pairs of the plurality of DC input voltage rails $105_1$-$105_N$ provide a same DC voltage.

The rail switching section 115 is coupled to the plurality of DC input voltage rails $105_1$-$105_N$ and is configured to connect any one of the plurality of DC input voltage rails $105_1$-$105_N$ to a switched rail output 117 having a switched rail output (or load) current IoSR. The rail switching section 115 may also provide a switched rail load current indication 119 of the switched rail load current IoSR. In some embodiments, the rail switching section 115 may accommodate disconnecting the switched rail output 117 from any of the DC input voltage rails $105_1$-$105_N$ and connecting it to a ground or common return point of the rail power supplies 107.

In the illustrated embodiment, the rail selection section 125 is coupled to the rail switching section 115 and is configured to direct switching between same-voltage ones of the plurality of DC input voltage rails $105_1$-$105_N$ based on a rail current availability from each DC input voltage rail (generally, rail supply current capacity margins) and an output current requirement of the switched rail output 117. The rail selection section 125 is configured to receive information on individual rail supply currents Iin1-IinN employing an individual rail load current indicator 126. The rail selection section 125 also receives the switched rail load current indication 119 of the switched rail load current IoSR. Additionally, the rail selection section 125 provides activation control signals 127 to the rail switching unit 115 that activate switching therein required to connect a selected DC input voltage rail to the switched rail output 117.

Figure 2:
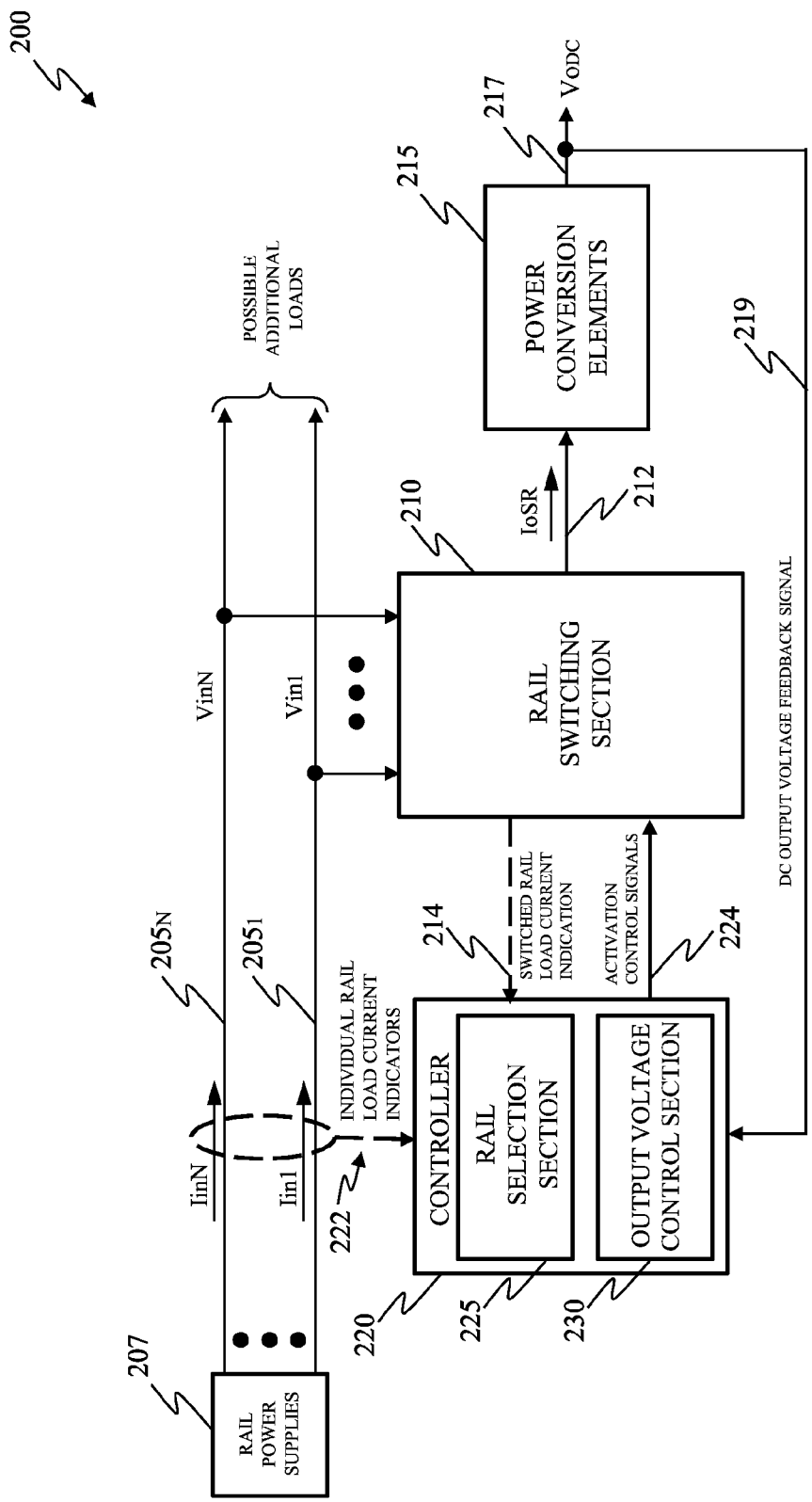
FIG. 2 illustrates a diagram of an embodiment of a dynamic multiple input rail power converter constructed according to the principles of the present disclosure.

FIG. 2 illustrates a diagram of an embodiment of a multiple input rail power converter, generally designated 200, constructed according to the principles of the present disclosure. The power converter 200 includes a plurality of DC input voltage rails $205_1$-$205_N$, a rail switching section 210, power conversion elements 215 and a controller 220 having a rail selection section 225 and an output voltage control section 230. The power converter 200 is generally constructed by adding the power conversion elements 215 and the output voltage control section 230 to the dynamic multiple input rail switching unit 100 of FIG. 1.

The DC input voltage rails $205_1$-$205_N$ are connected to rail power supplies 207 to provide corresponding rail input voltages Vin1-VinN, as before. In the illustrated embodiment, the rail switching section 210 may alternately connect a switched rail output 212, between one of the DC input voltage rails $205_1$-$205_N$ during a charging time of the power conversion elements 215 and alternately, to a ground or common return point of the rail power supplies 207. The switched rail output 212 provides a switched rail load current IoSR, which is also an input load current for the power conversion elements 215. The rail switching section 210 may also provide a switched rail load current indication 214 (power conversion elements input current) to the rail selection section 225 portion of the controller 220, as before. The power conversion elements 215 correspond to the specific additional circuits or components required to convert a switched rail voltage on the switched rail output 212 into the converter output voltage VoDC.

Generally, the controller 220 provides activation control signals 224 to the rail switching section 210 that control proper selection timing and supply current balancing of the DC input voltage rails $205_1$-$205_N$, as well as control for maintaining a selected value of converter output voltage VoDC on a converter output 217. Individual rail load current indicators 222 provide needed supply current loading information (Iin1-IinN) of each of the DC input voltage rails $205_1$-$205_N$ for the rail selection section 225 and allow rail supply current balancing across same-voltage DC input voltage rails. The output voltage control section 230 employs a DC output voltage feedback signal 219 to provide another portion of the activation control signals 224 that maintains a set-point for the output voltage VoDC as an output current varies due to loading changes on the converter output 217.

Figure 3:
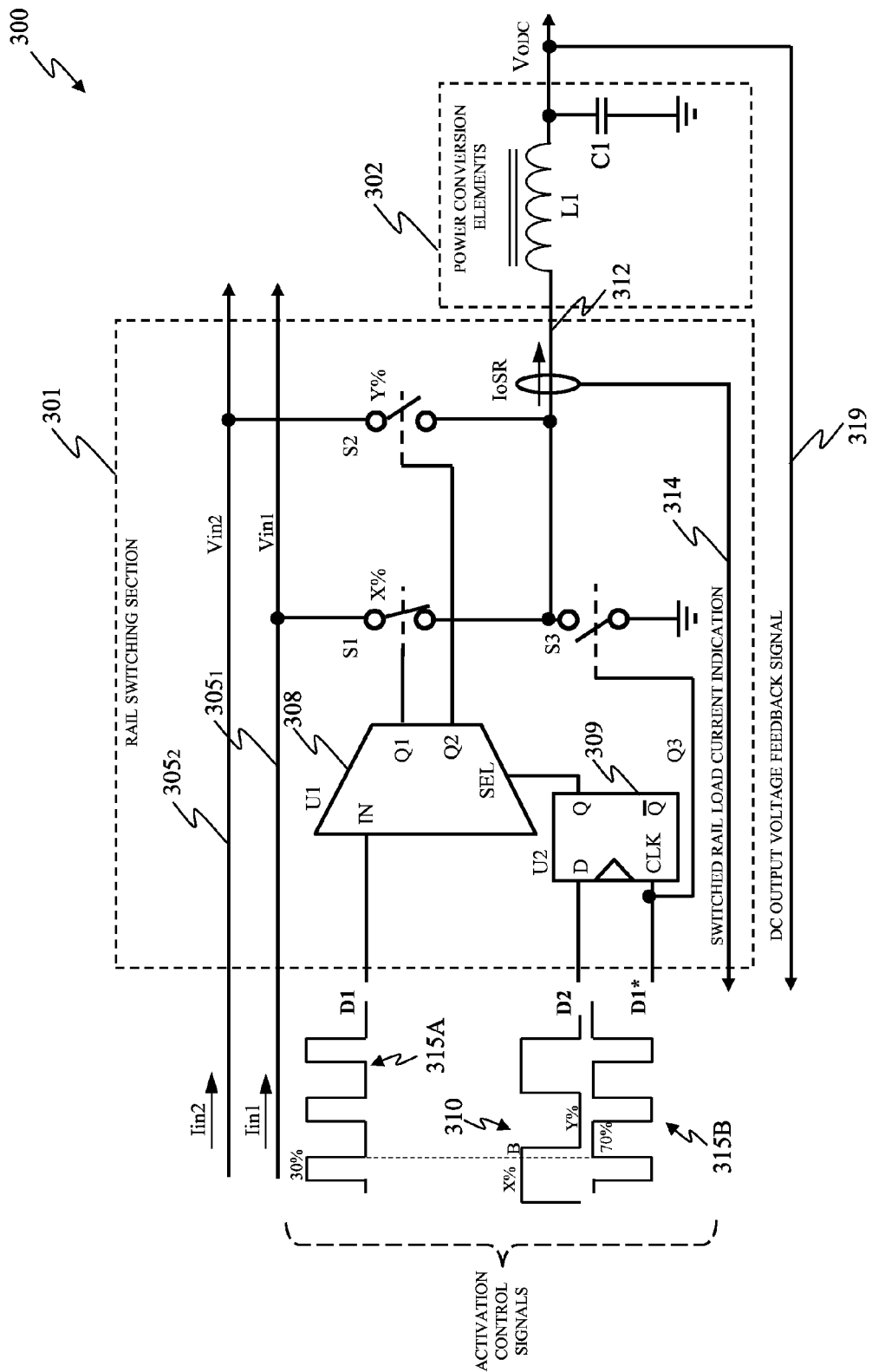
FIG. 3 illustrates a diagram of an example of a power converter output portion constructed according to the principles of the present disclosure.

FIG. 3 illustrates a diagram of an example of a power converter output portion, generally designated 300, constructed according to the principles of the present disclosure.

The power converter output portion 300 is representative of a buck converter and includes a rail switching section 301 and power conversion elements 302. Additionally, switching elements illustrated in this embodiment are shown in a generic switch format. This generic switch format is employed to indicate that any switching element or device appropriate to an application and corresponding to the principles of the present disclosure may be employed.

For example, a single switching element, a group of series-connected switching elements, a group of parallel-connected switching elements or a combination of single, series-connected and parallel-connected switching elements may be employed. Additionally, solid state or semiconductor switching devices, optical switching devices or magnetic switching devices may also be employed. These devices may be either active switches (e.g., MOSFETS) or passive switches (e.g., diodes), as appropriate to a particular application.

The rail switching section 301 includes first and second rail switching elements S1, S2, a third switching element S3, a rail switching element selector 308 (U1) and a switching coordination unit 309 (U2). The first and second rail switching elements S1, S2 are respectively connected between first and second DC input voltage rails $305_1$, $305_2$ (that provide corresponding rail input voltages Vin1, Vin2) and a switched rail output 312 that is common to both. The switching element selector 308 determines which of the first and second rail switching elements S1, S2 is selected for activation. The third switching element S3 is activated to provide a synchronous switch for the buck converter when neither of the first and second rail switching elements S1, S2 is activated. The power conversion elements 302 include an inductor L1 and a capacitor C1 that are connected as shown to provide a converter output voltage VoDC.

In the illustrated example, activation control signals include first and second output voltage control signals 315A (D1), 315B (D1*) and an input voltage control signal 310 (D2). Here, D1* is the complement waveform of D1, as shown. The input voltage control signal 310 is provided by a rail selection section and the first and second output voltage control signals 315A, 315B are provided by an output voltage control section, which are not shown in FIG. 3.

In some embodiments, a duty cycle of the input voltage control signal 310 may be determined solely by current margins available from the first and second voltage rails $305_1$, $305_2$ (i.e., load current conditions of Iin1, Iin2). Alternately, a switched rail load current indication 314 may be additionally employed by the associated rail selection section to facilitate selection between the first and second DC input voltage rails $305_1$, $305_2$.

For a first example of balancing rail supply currents employing the activation control signals (as shown in FIG. 3), assume that the first and second voltage rails $305_1$, $305_2$ have a maximum load current capability of 75 A and each is delivering 50 A. That is, each has a rail supply current capacity margin of 25 A. Then, a supply current balance ratio (percentage) for each voltage rail may be calculated as:

$$\text{balance ratio} = (75-50)/[(75-50)+(75-50)]: \quad (1)$$

$$(75-50)/[(75-50)+(75-50)]$$

$$= 50\% : 50\%,$$

which determines a duty cycle of 50% for the input voltage control signal 310, under these conditions. This action balances the currents provided by the first and second voltage rails $305_1$, $305_2$.

As another example, assume that the first voltage rail $305_1$ is providing 75 A, the second voltage rail $305_2$ is providing only 50 A, and an additional 25 A is required. Since there is no additional current available from the first voltage rail $305_1$, the additional 25 A is taken from the second voltage rail $305_2$. For this example, the duty cycle of the input voltage control signal 310 becomes zero percent (0%), since the additional 25 A is provided solely from second voltage rail $305_2$. This, of course, again balances the currents drawn from the first and second voltage rails $305_1$, $305_2$.

The first output voltage control signal 315A is employed to activate one or the other of the first and second rail switching elements S1, S2 for a specific time period, which is dependent on the DC output voltage feedback signal 319 (i.e., VoDC). In the illustrated example, the first output voltage control signal 315A has an activation time corresponding to a 30 percent duty cycle of its waveform. The second output voltage control signal 315B has a 70 percent activation duty cycle, which is complementary to the first output voltage control signal 315A. Here, it is employed to activate the switching element S3 when neither of the first or second rail switching elements S1, S2 is activated.

In this embodiment, the switching coordination unit 309 synchronizes the switching of input voltage control signal 310 and first and second output voltage control signals 315A, 315B. In the illustrated embodiment, the switching coordination unit 309 is a D flip-flop. The input voltage control signal 310 is connected to its D input, the second output voltage control signal 315B is employed as a clock signal for the switching coordination unit 309, and the Q output is connected to the switching element selector 308, as shown. This arrangement ensures that the switching element selector 308 only switches when the first voltage control signal 315A is not in its activating position (as noted by marker B).

Table 1 below provides a specific truth table for control of the first and second rail switching elements S1, S2 and the third switching element S3 as functions of the first output voltage control signal 315A (D1) and the input voltage control signal 310 (D2).

TABLE 1

Switch Activation Table for FIG. 3

| D1 | D2 | Q1 | Q2 | Q3 |
|----|----|----|----|----|
| 1  | 1  | 1  | 0  | 0  |
| 1  | 0  | 0  | 1  | 0  |
| 0  | 1  | 0  | 0  | 1  |
| 0  | 0  | 0  | 0  | 1  |

As may be seen in Table 1, when D1 and D2 are true, the switching element selector output Q1 only activates the first rail switching element S1 (as indicated in FIG. 3). Similarly, when D1 is true and D2 is false, the switching element selector output Q2 will only activate the second rail switching element S2. For all other D1, D2 conditions, only the third switching element S3 will be activated.

Figure 4:
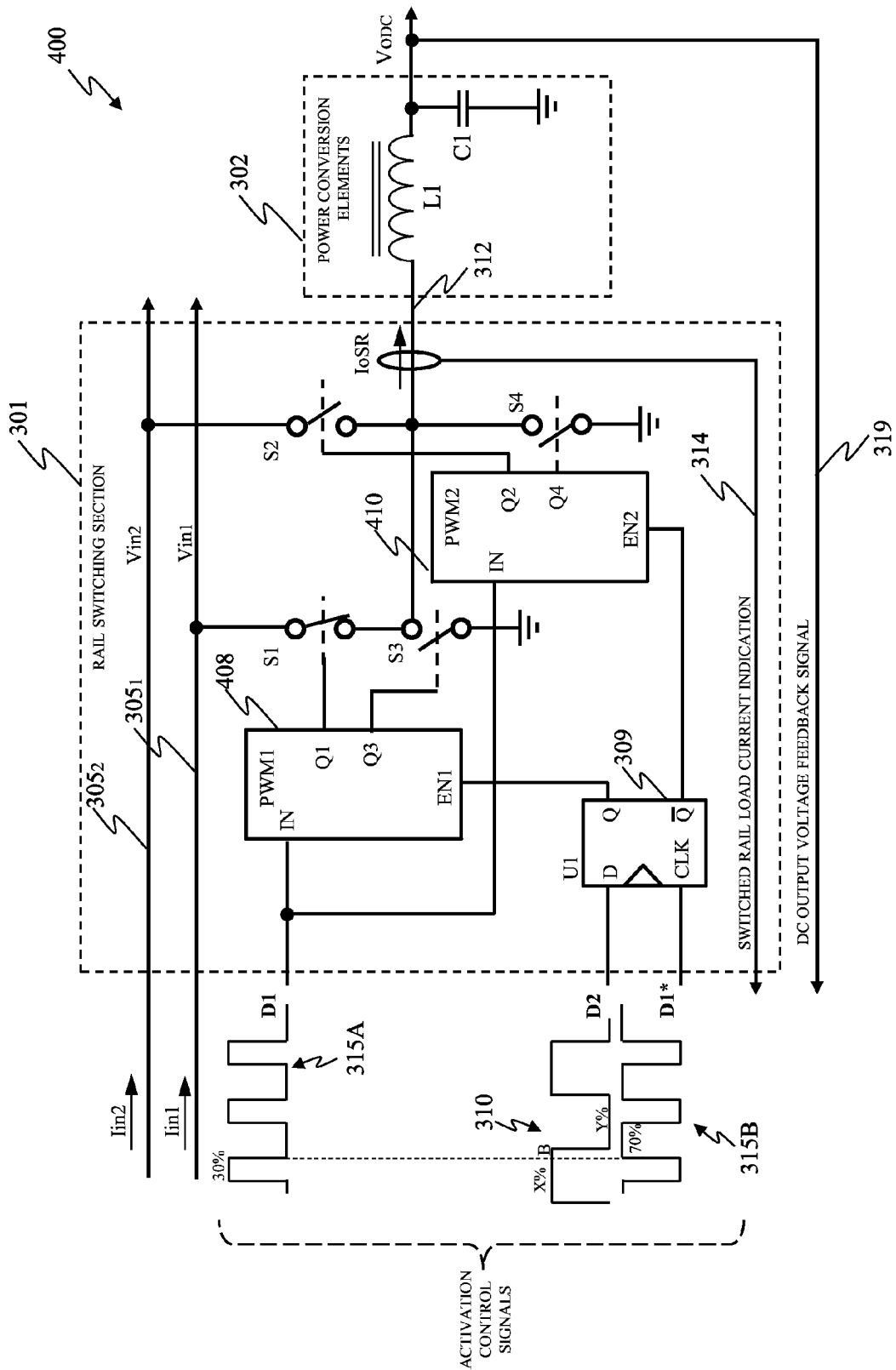
FIG. 4 illustrates a diagram of another example of a power converter output portion constructed according to the principles of the present disclosure.

FIG. 4 illustrates a diagram of another example of a power converter output portion, generally designated 400, constructed according to the principles of the present disclosure. The power converter output portion 400 provides a general structure and operation that mirrors the general structure and operation of the power converter output portion 300 discussed with respect to FIG. 3 above. Here, however, separate first and second switching element selectors 408, 410 are employed to respectively control activation of separate switch pairs S1:S3 and S2:S4 as may be required in a particular application. Again, switching coordination between the activation control signals has been included to provide a lossless switching environment.

Table 2 below provides a specific truth table for control of the first and second rail switching elements S1, S2 and the third and fourth switching elements S3, S4 as functions of the first output voltage control signal 315A (D1) and the input voltage control signal 310 (D2).

TABLE 2

Switch Activation Table for FIG. 4

| D1 | D2 | Q1 | Q2 | Q3 | Q4 |
|----|----|----|----|----|----|
| 1  | 1  | 1  | 0  | 0  | 0  |
| 1  | 0  | 0  | 1  | 0  | 0  |
| 0  | 1  | 0  | 0  | 0  | 1  |
| 0  | 0  | 0  | 0  | 1  | 0  |

As may be seen in Table 2, when D1 and D2 are true, the switching element selector output Q1 only activates the first rail switching element S1 (as indicated in FIG. 4). Similarly, when D1 is true and D2 is false, the switching element selector output Q2 will only activate the second rail switching element S2. Correspondingly, when D1 is false and D2 is true, only the fourth switching element S4 will be activated, and when D1 is false and D2 is false, only the third switching element S3 will be activated.

Figure 5:
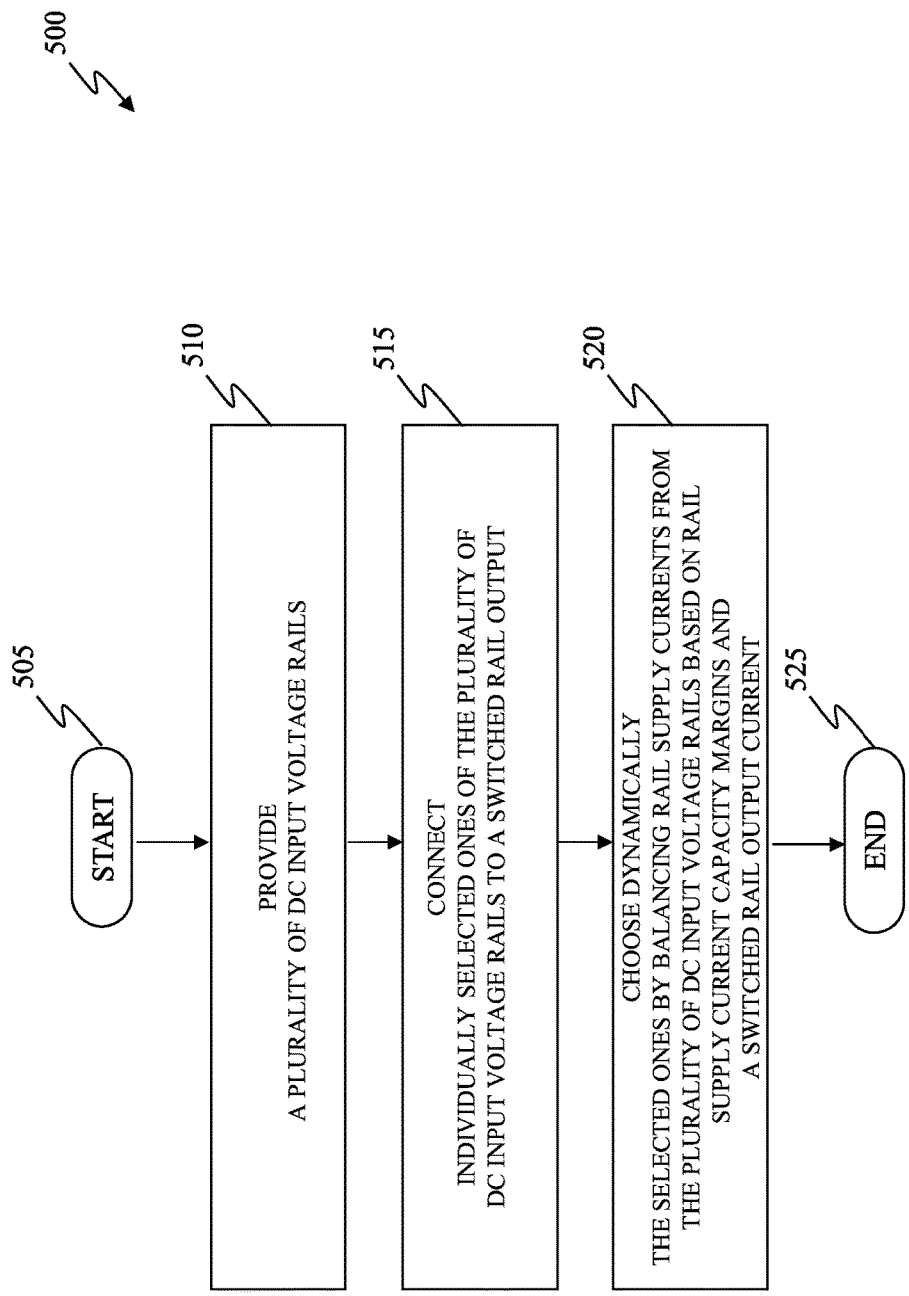
FIG. 5 illustrates a flow diagram of an embodiment of a dynamic multiple input rail power converter operating method carried out according to the principles of the present disclosure.

FIG. 5 illustrates a flow diagram of an embodiment of a dynamic multiple input rail switching unit operating method, generally designated 500, carried out according to the principles of the present disclosure. The method 500 starts in a step 505, and in a step 510, a plurality of DC input voltage rails is provided. Then, individually selected ones of the plurality of DC input voltage rails are connected to a switched rail output, in a step 515. The selected ones are chosen dynamically by balancing rail supply currents from the plurality of DC input voltage rails based on rail supply current capacity margins and a switched rail output current, in a step 520.

In one embodiment, alternately connecting the switched rail output to a voltage common or ground point instead of to the selected ones of the plurality of DC input voltage rails is further included. In another embodiment, a reduction in switching power losses is provided by synchronously timing a switching between the plurality of DC input voltage rails and another switching for regulation of the switched rail output current. In yet another embodiment, a supply current balance ratio between the plurality of DC input voltage rails is dynamically determined at or during run time in response to changes in the rail supply current capacity margins or the switched rail output current. In still another embodiment, at least one of a rail supply current of each of the plurality of DC input voltage rails and the switched rail output current is monitored.

In a further embodiment, a routing of the selected ones of the plurality of DC input voltage rails to the switched rail output employs at least one selected from the group consisting of a single switch switching element, a group of series-connected switching elements, a group of parallel-connected switching elements and a combination of single, series-connected and parallel-connected switching elements.

In yet a further embodiment, a routing of the selected ones of the plurality of DC input voltage rails to the switched rail output employs at least one selected from the group consisting of a solid state or a semiconductor switching device, an optical switching device and a magnetic switching device. The method 500 ends in a step 525.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A dynamic multiple input rail switching unit, comprising:
   a plurality of DC input voltage rails;
   a rail switching section coupled to the plurality of DC input voltage rails and configured to individually connect selected ones of the plurality of DC input voltage rails to a switched rail output; and
   a rail selection section coupled to the rail switching section and configured to dynamically choose the selected ones by balancing rail supply currents from the plurality of DC input voltage rails based on rail supply current capacity margins and a switched rail output current.

2. The switching unit as recited in claim 1 wherein a reduction in switching power losses is provided by a synchronous timing of a switching between the plurality of DC input voltage rails and another switching for regulation of the switched rail output current.

3. The switching unit as recited in claim 1 wherein a supply current balance ratio between the plurality of DC input voltage rails is dynamically determined at or during run time in response to changes in the rail supply current capacity margins or the switched rail output current.

4. The switching unit as recited in claim 1 wherein at least one of a rail supply current of each of the plurality of DC input voltage rails and the switched rail output current is monitored.

5. The switching unit as recited in claim 1 wherein a routing of the selected ones of the plurality of DC input voltage rails to the switched rail output employs at least one selected from the group consisting of:
   a single switching element;
   a group of series-connected switching elements;
   a group of parallel-connected switching elements; and
   a combination of single, series-connected and parallel-connected switching elements.

6. The switching unit as recited in claim 1 wherein a routing of the selected ones of the plurality of DC input voltage rails to the switched rail output employs at least one selected from the group consisting of:
   a solid state or a semiconductor switching device;
   an optical switching device; and
   a magnetic switching device.

7. The switching unit as recited in claim 1 further configured to alternately connect the switched rail output to a voltage common or ground point instead of to the selected ones of the plurality of DC input voltage rails.

8. A dynamic multiple input rail switching unit operating method, comprising:
   providing a plurality of DC input voltage rails;
   connecting individually selected ones of the plurality of DC input voltage rails to a switched rail output; and
   choosing dynamically the selected ones by balancing rail supply currents from the plurality of DC input voltage rails based on rail supply current capacity margins and a switched rail output current.

9. The method as recited in claim 8 wherein a reduction in switching power losses is provided by a synchronous timing of a switching between the plurality of DC input voltage rails and another switching for regulation of the switched rail output current.

10. The method as recited in claim 8 wherein a supply current balance ratio between the plurality of DC input voltage rails is dynamically determined at or during run time in response to changes in the rail supply current capacity margins or the switched rail output current.

11. The method as recited in claim 8 wherein at least one of a rail supply current of each of the plurality of DC input voltage rails and the switched rail output current is monitored.

12. The method as recited in claim 8 wherein a routing of the selected ones of the plurality of DC input voltage rails to the switched rail output employs at least one selected from the group consisting of:
   a single switching element;
   a group of series-connected switching elements;
   a group of parallel-connected switching elements; and
   a combination of single, series-connected and parallel-connected switching elements.

13. The method as recited in claim 8 wherein a routing of the selected ones of the plurality of DC input voltage rails to the switched rail output employs at least one selected from the group consisting of:
   a solid state or a semiconductor switching device;
   an optical switching device; and
   a magnetic switching device.

14. The method as recited in claim 8 further including alternately connecting the switched rail output to a voltage common or ground point instead of to the selected ones of the plurality of DC input voltage rails.

15. A dynamic multiple input rail power converter, comprising:
   a plurality of DC input voltage rails;
   a rail switching section coupled to the plurality of DC input voltage rails that individually connects selected ones of the plurality of DC input voltage rails to a switched rail output, which is further connected to power conversion elements to provide a DC output voltage;
   a rail selection section coupled to the rail switching section that dynamically chooses the selected ones by balancing rail supply currents from the plurality of DC input voltage rails based on rail supply current capacity margins and an input current of the power conversion elements; and
   an output voltage control section coupled to the rail selection section that provides regulation of the DC output voltage.

16. The power converter as recited in claim 15 wherein the power conversion elements form a buck converter to provide the DC output voltage.

17. The power converter as recited in claim 15 wherein a reduction in switching power losses is provided by a synchronous timing of a switching between the plurality of DC input voltage rails and another switching for regulation of the DC output voltage.

18. The power converter as recited in claim 15 wherein a supply current balance ratio between the plurality of DC input voltage rails is dynamically determined at or during run time in response to changes in the rail supply current capacity margins or the input current of the power conversion elements.

19. The power converter as recited in claim 15 wherein at least one of a rail supply current of each of the plurality of DC input voltage rails and the input current of the power conversion elements is monitored.

20. The power converter as recited in claim 15 further configured to alternately connect the switched rail output to a voltage common or ground point instead of to the selected ones of the plurality of DC input voltage rails.

* * * * *